US010383197B2

(12) United States Patent
Cairns et al.

(10) Patent No.: US 10,383,197 B2
(45) Date of Patent: Aug. 13, 2019

(54) CLOUD CONNECTED LIGHTING SYSTEM

(71) Applicant: Technical Consumer Products, Inc., Aurora, OH (US)

(72) Inventors: Dustin Cairns, Rootstown, OH (US); Paul Phillips, Aurora, OH (US); Jimmy Zheng, Aurora, OH (US); Melvin Cosby, Grand River, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 15/696,455

(22) Filed: Sep. 6, 2017

(65) Prior Publication Data
US 2018/0317303 A1 Nov. 1, 2018

Related U.S. Application Data

(60) Provisional application No. 62/490,279, filed on Apr. 26, 2017.

(51) Int. Cl.
*H04W 4/80* (2018.01)
*H04L 12/28* (2006.01)
*H04W 76/14* (2018.01)
*H04W 84/12* (2009.01)
*H04W 84/18* (2009.01)
*H05B 37/02* (2006.01)

(52) U.S. Cl.
CPC ........ *H05B 37/0272* (2013.01); *H04W 76/14* (2018.02); *H05B 37/0236* (2013.01); *H04L 12/2803* (2013.01); *H04W 4/80* (2018.02); *H04W 84/12* (2013.01); *H04W 84/18* (2013.01)

(58) Field of Classification Search
None
See application file for complete search history.

(56) References Cited

U.S. PATENT DOCUMENTS

| | | | | | |
|---|---|---|---|---|---|
| 7,642,730 | B2 * | 1/2010 | Dowling | ................ | H05B 37/02 315/292 |
| 8,106,607 | B2 * | 1/2012 | Pope | ...................... | G08C 17/02 315/294 |
| 8,188,686 | B1 * | 5/2012 | Pope | ...................... | G08C 17/02 315/294 |
| 8,207,821 | B2 * | 6/2012 | Roberge | .................... | F21K 9/00 340/9.11 |
| 8,729,826 | B2 * | 5/2014 | Jonsson | .................... | F21V 3/00 315/297 |
| 8,878,442 | B2 * | 11/2014 | Lu | ........................... | F21S 6/001 313/110 |

(Continued)

*Primary Examiner* — Dion Ferguson
*Assistant Examiner* — Srinivas Sathiraju
(74) *Attorney, Agent, or Firm* — Thompson Hine LLP

(57) ABSTRACT

A wireless device for connection to a network is disclosed. The wireless device includes an antenna for establishing a wireless connection, one or more processors, and a memory coupled to the processor. The memory stores data comprising a sequence of characters that uniquely names a particular type of network that the antenna establishes communication with and program code. When executed by the one or more processors, the program code causes the system to initially set the one or more processors into a default mode. In response to connecting the wireless device to mains power, the program code causes the system to receive network information through the wireless connection.

20 Claims, 5 Drawing Sheets

(56) References Cited

U.S. PATENT DOCUMENTS

| | | | | |
|---|---|---|---|---|
| 9,198,204 B2* | 11/2015 | Mathews | ................ | H04W 4/70 |
| 9,332,608 B2* | 5/2016 | Jonsson | ................ | F21V 3/00 |
| 9,439,068 B2* | 9/2016 | Chen | ................ | H04W 76/10 |
| 9,609,725 B2* | 3/2017 | Bosua | ................ | H05B 33/0857 |
| 9,697,788 B2* | 7/2017 | Yamazaki | ................ | G09G 3/3677 |
| 9,833,707 B2* | 12/2017 | Watson | ................ | A63F 13/52 |
| 9,900,965 B2* | 2/2018 | Jonsson | ................ | H05B 37/0272 |
| 2015/0350185 A1* | 12/2015 | Cairns | ................ | H04L 12/2816 |
| | | | | 726/7 |
| 2015/0350810 A1* | 12/2015 | Cairns | ................ | H04L 47/6225 |
| | | | | 455/41.2 |
| 2015/0351195 A1* | 12/2015 | Sargent | ................ | F21V 15/01 |
| | | | | 315/158 |
| 2016/0165439 A1* | 6/2016 | Chen | ................ | H04W 76/10 |
| | | | | 726/12 |

\* cited by examiner

CLOUD CONNECTED LIGHTING SYSTEM

RELATED APPLICATIONS

This application claims the benefit of U.S. Provisional Application No. 62/490,279, filed on Apr. 26, 2017.

TECHNICAL FIELD

The present disclosure relates generally to a wireless device for establishing wireless communication, and more particularly to a wireless device having a memory storing a sequence of characters that uniquely names a particular type of network that the antenna establishes communication with.

BACKGROUND

Building and home automation systems involve the control and automation of various devices found in a home or office such as lighting, heating, ventilation and air conditioning (HVAC) systems, and home appliances. Home automation systems typically include switches and sensors connected to a central hub, which may be referred to as a gateway. The gateway is used to connect the various devices found in a home to the cloud. The devices may be controlled by a user interface that is integrated into a wireless device such as, for example, a smartphone or tablet computer. For example, a user may indicate that the lighting in a particular room or area of the house should be brightened, dimmed, or turned off using the interface of the wireless device.

In another approach, various devices may be connected to a device that controls devices based on voice activation. Specifically, the devices may connect to a hub. The hub is connected to a voice-activated smart speaker that detects the user's voice and analyzes the user's voice in order to determine a particular command or request. The smart speaker is connected to the cloud. A user may use verbal commands to complete a task. For example, a user may dim, turn on, or turn off the lights in a particular room of a house using voice commands. However, the microphone of the smart speaker only has the ability to detect voice commands within a limited proximity. Therefore, if a user wishes to control all of the devices within his or her home, then a separate smart speaker may be required for each room, which can become costly. Furthermore, the provider of the smart speaker may charge the user to access the cloud.

SUMMARY

In one embodiment, a wireless device for connection to a network is disclosed. The wireless device includes an antenna for establishing a wireless connection, one or more processors, and a memory coupled to the processor. The memory stores data comprising a sequence of characters that uniquely names a particular type of network that the antenna establishes communication with and program code. When executed by the one or more processors, the program code causes the system to initially set the one or more processors into a default mode. In response to connecting the wireless device to mains power, the program code causes the system to receive network information through the wireless connection.

In another embodiment, a wireless device for connection to a network is disclosed. The wireless device includes an antenna for establishing a wireless connection, a microphone for detecting voice commands and sound, one or more processors in communication with the microphone, and a memory coupled to the one or more processors. The memory stores a voice command service profile that defines instructions to decode voice commands into text by the one or more processors and program code that, when executed by the one or more processors, causes the processors to wirelessly connect to a portable electronic device by the wireless connection. The processors are further cause to decode a voice command detected by the microphone into text, and analyze the text to determine at least one specific key feature required to recognize a specific command embedded within the text. The specific key feature is indicative of an action that requires execution by the processor of the wireless device. Finally, the processors are caused to communicate the specific key feature over the wireless connection.

Other objects and advantages of the disclosed method and system will be apparent from the following description, the accompanying drawings and the appended claims.

DETAILED DESCRIPTION

Figure 1:
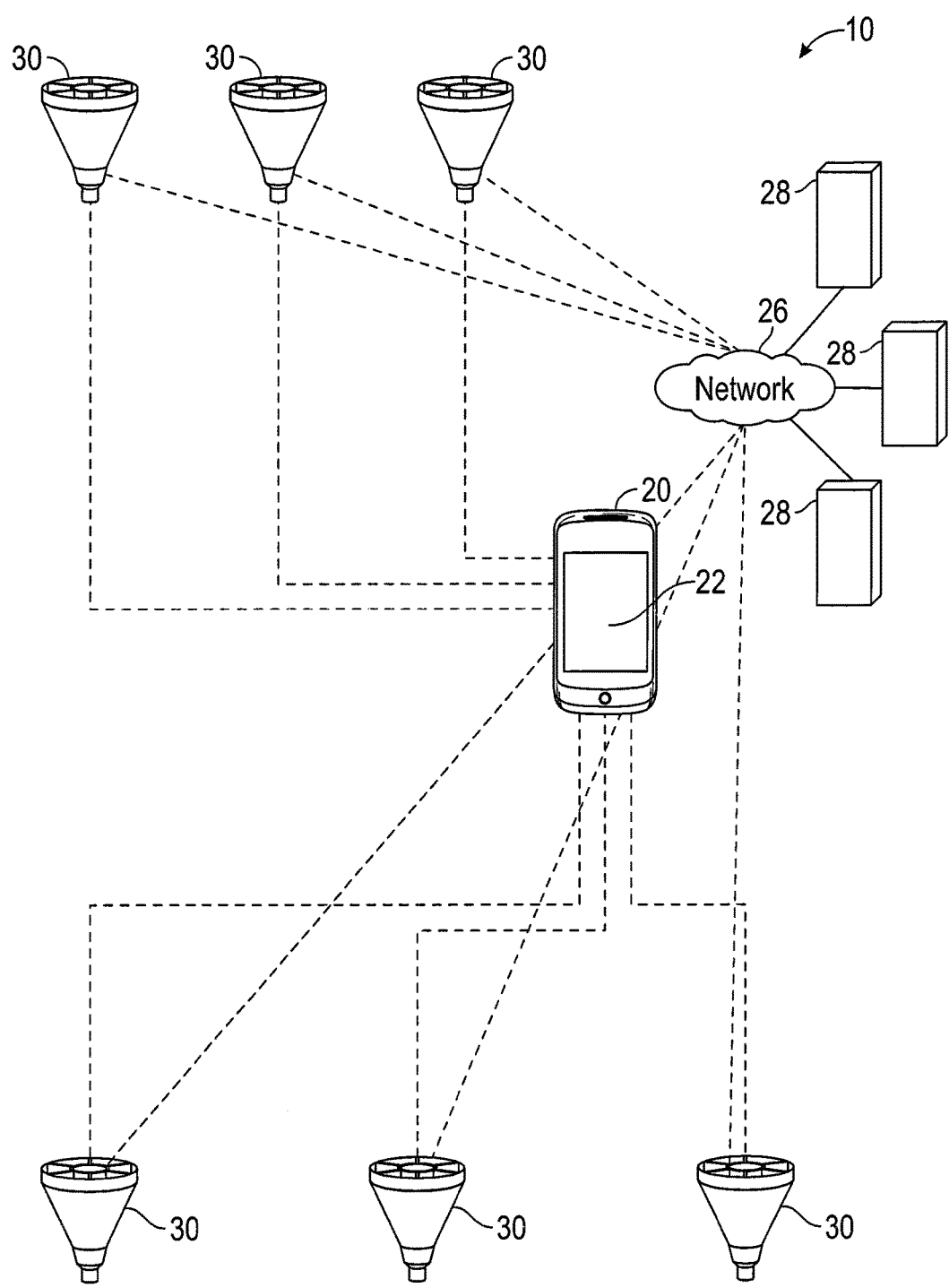
FIG. 1 is a schematic illustration of an exemplary wireless lighting control system.

The following detailed description will illustrate the general principles of the invention, examples of which are additionally illustrated in the accompanying drawings. In the drawings, like reference numbers indicate identical or functionally similar elements.

FIG. 1 is an exemplary schematic illustration of a wireless lighting control system 10. The wireless lighting control system 10 may include a portable electronic device 20 in wireless communication with a plurality of lighting fixtures 30. The lighting fixtures 30 are also in communication with one or more servers 28 through a network 26. The network 26 includes one or more private or public networks (e.g., the Internet) that enable the exchange of data. As explained in greater detail below, the server 28 may be associated with a particular manufacturer, distributer, or retailer of the lighting devices 30. In one embodiment, the light fixtures 30 may be located in one or more rooms of a home or office, and may be controlled using the portable electronic device 20. The lighting fixtures 30 may also include a microphone in order to detect sounds within the office or home, and may be controlled using sound. Specifically, the lighting fixtures 30 may be controlled based on sounds heard throughout the home or office or by speech, and is described in greater detail below.

Figure 4:
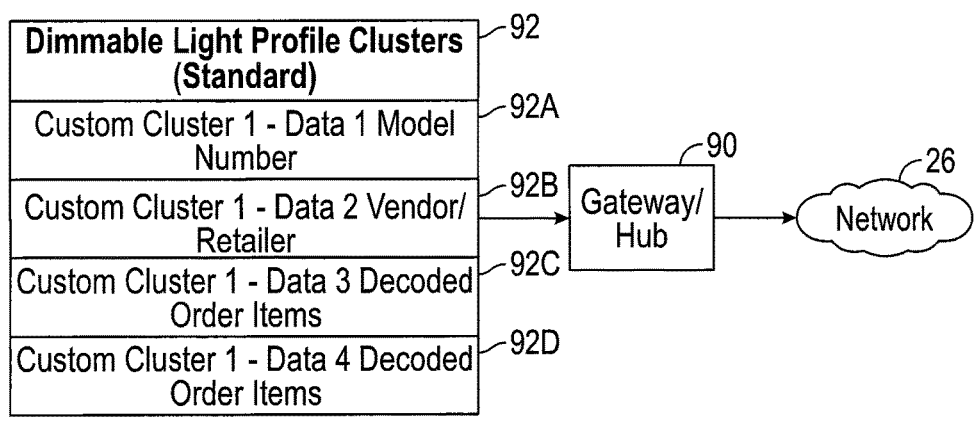
FIG. 4 is a schematic illustration of an exemplary wireless lighting control system based on a personal area network.

In one embodiment, the lighting fixtures 30 may each be any type of illumination device for emitting visible light, which includes an antenna element 40 (shown in FIG. 2) that is configured to send and receive radio frequency (RF) signals. The antenna element 40 may connect a corresponding lighting fixture 30 to the network 26. Additionally, in one embodiment the lighting fixtures 30 may each be connected to one another using a mesh network. The lighting devices 30 may be connected together in a mesh network using a variety of different protocols. For example, in one embodiment the antenna element 40 may be configured to send and receive wireless local area network (WLAN) signals such as, for example, signals based on the Institute of Electrical and Electronics Engineers (IEEE) 802.11 standard. In another embodiment as shown in FIG. 4 below, the lighting fixtures 30 may be connected using a personal area network based on the IEEE 802.15.4 specification.

The lighting fixtures 30 may be any type of lighting fixture configured to emit visible light such as, but not limited to, a light emitting diode (LED) lamp, an incandescent lamp, a compact fluorescent lamp (CFL), or a gas-discharge lamp. Furthermore, although the present disclosure describes lighting fixtures 30, it is to be appreciated that the system 10 is not limited to lighting fixtures. Instead, the system 10 may include other devices that may be placed throughout a home or office that include wireless networking capabilities, and which are continuously connected to the mains power in a building.

The portable electronic device 20 may be any type of portable electronic device that sends and receives RF signals. In particular, in one embodiment the portable electronic device 20 may be configured to wirelessly connect with the lighting fixtures 30. For example, in one embodiment the portable electronic device 20 may be connected to the lighting fixtures 30 by signals based on the IEEE 802.11 standard. The portable electronic device 20 may be, for example, a smartphone, a tablet, a laptop computer, a personal computer, or a smart speaker. The portable electronic device 20 may include a user interface that allows a user to enter input. The portable electronic device 20 may also include a display that generates an image visible to the user. In the embodiment as shown, the user interface and display are combined with one another as a touchscreen 22. However, it is to be understood that the embodiment as illustrated in the figures is merely exemplary in nature, and that a separate user interface and display may be used as well. Furthermore, although FIGS. 1-5 illustrate the portable electronic device 20 as a smartphone, in the embodiment as shown in FIG. 6 the portable electronic device 20 may include a smart speaker as well, where the smart speaker is a voice-activated device that detects a user's voice and analyzes the user's voice in order to determine a particular command or request Turning now to FIG. 2, the portable electronic device 20 includes a processor 50, memory 52, an antenna element 54 and communications circuitry 56. When the portable electronic device 20 is in operation, the processor 50 executes instructions stored within the memory 52, to communicate data to and from the memory 52, and to generally control operations of the portable electronic device 20 pursuant to the instructions. A processor may be any custom made or commercially available processor, a central processing unit (CPU), or generally any device for executing instructions.

The antenna element 54 may be in signal communication with the processor 50. Similar to the antenna element 40 of the lighting fixtures 30, the antenna element 54 may also be configured to send and receive RF signal such as, for example, for example, signals based on the IEEE 802.11 standard. The communications circuitry 56 may be any type of circuitry operative to connect to a communications network and to transmit communications (e.g., data) from the portable electronic device 20 to other devices within a communications network. In one embodiment, an application or software 60 may be downloaded into the memory 52 of the portable electronic device 20. The software 60 may be used to enable wireless control of the lighting fixtures 30 by the portable electronic device 20, and is described in greater detail below.

Figure 2:
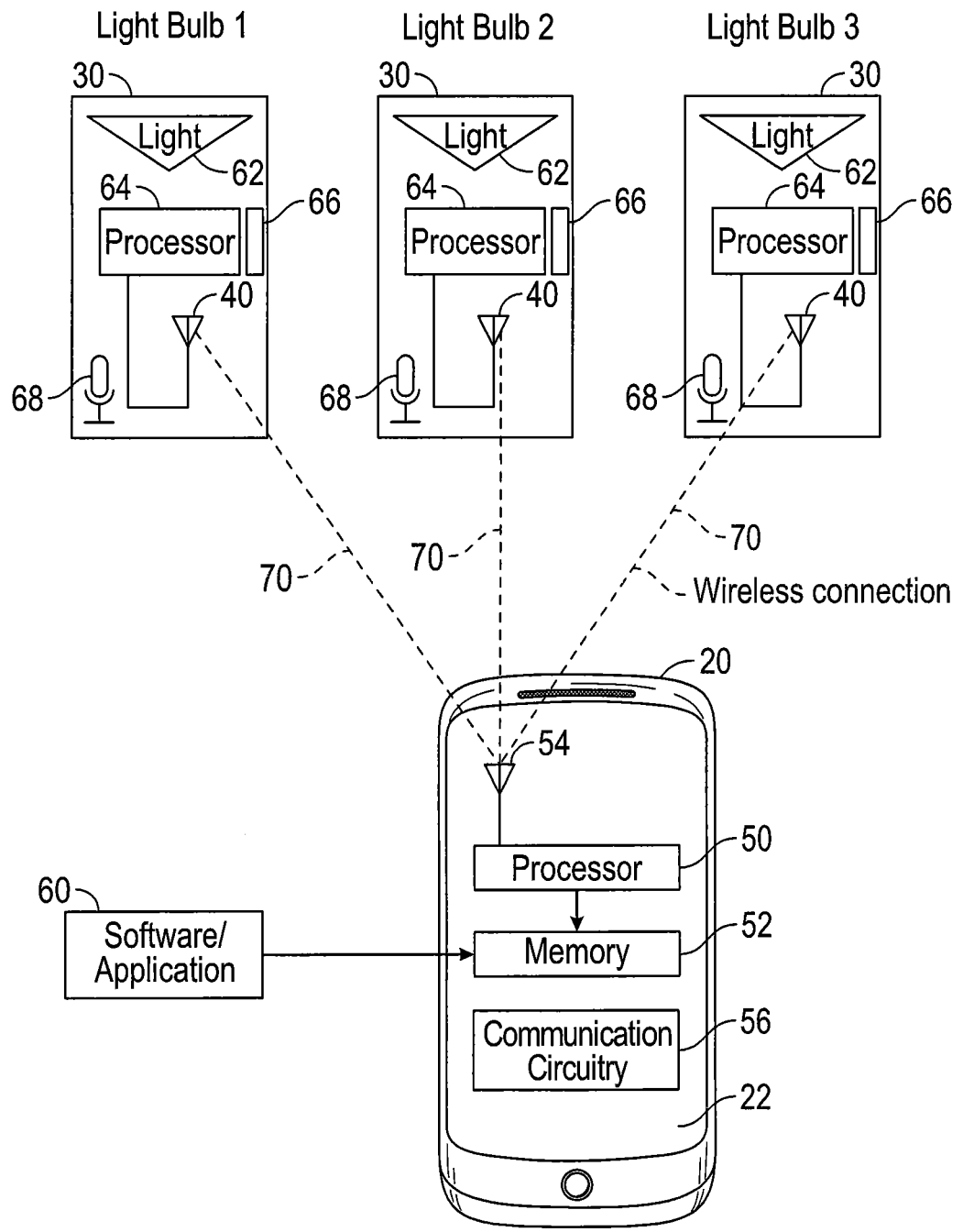
FIG. 2 is a schematic illustration of a portable electronic device and an array of lighting fixtures shown in FIG. 1.

FIG. 2 also illustrates the lighting fixtures 30. Each lighting fixture 30 includes one or more lighting elements 62, a processor 64, memory 66, a microphone 68, and the antenna element 40. The processor 64 may be in signal communication with the lighting elements 62, the memory 66, the microphone 68, and the antenna element 40. The processor 64 may be used to control and deliver power to the lighting element 62. The lighting element 62 may be any type of device that generates visible light such as, for example, one or more light emitting diodes (LEDs) or a filament of an incandescent light.

The processor 64 of each lighting fixture 30 may be in communication with the portable electronic device 20 through a wireless connection 70. As discussed above, in one embodiment the wireless connection 70 is based on WLAN signals such as, for example, signals based on the IEEE 802.11 standard. The memory 66 of each lighting fixture 30 stores a sequence of characters that uniquely names a particular type of network that the antenna element 40 may establish communication with. For example, in the embodiment as discussed the lighting fixtures 30 connects to a WLAN network, and a pre-defined service set identifier (SSID) is saved in the memory 66. An SSID is a sequence of characters that uniquely names the WLAN, and is sometimes referred to as a network name.

An SSID includes a case sensitive sequence of alphanumeric characters with a maximum length of 32 characters. The SSID saved in the memory 66 may include a static set of characters combined with a semi-unique set of characters. Specifically, each SSID may start with a particular sting of static characters representing the server 28 (FIG. 1). As mentioned above, the server 28 is associated with a manufacturer, distributer, or retailer of the lighting devices 30. In one exemplary embodiment, the server 28 is associated with a manufacturer of the lighting devices 30. In one particular embodiment, the lighting fixtures 30 may be manufactured by Technical Consumer Products Inc., of Aurora, Ohio. Accordingly, the SSID stored in memory 66 would start with the letters 'TCP'. The semi-unique set of characters are the last few digits of the SSID, and represent a particular lighting device 30. For example, in one embodiment the last four digits of the SSID represent the serial number of a particular lighting fixture 30.

It is to be appreciated that in one embodiment, the SSID may only indicate the specific serial number of the device, and not the manufacturer, distributer, or retailer of the lighting devices 30. Instead, the manufacturer, distributer, or retailer of the lighting device 30 is sent from the network 26, and is shown in FIG. 3B below.

The lighting fixtures 30 may be initially set to a default mode for a wireless router. In the example present example where WLAN is used, the lighting fixtures 30 are set to an access point (AP) mode. In response to a lighting fixture 30 initially connecting to mains power (i.e., when a user screws one of the lighting fixtures 30 into a lamp socket), the 40 antenna receives the WLAN information through the wireless connection 70. The WLAN information includes wireless connection information as well as user account information, which is explained below. The lighting fixture 30 may then connect to the servers 28 through the network 26 (FIG. 1).

Continuing to refer to FIG. 2, the software 60 saved in the memory 52 of the portable electronic device 20 may be used to wirelessly control the lighting fixtures 30. The portable electronic device 20 may connect to the lighting fixtures 30 when the lighting fixtures 30 are set to the default or AP mode. The portable electronic device 20 enters a device provisioning mode in response to a user to logging in to the software application 60. The user may log in by entering a username and/or a password using the touchscreen 22 of the portable electronic device 20. The software 60 connects the portable electronic device 20 to the lighting devices 30 based on the specific operating system employed. For example, in one embodiment the software 60 manages connection to the lighting devices 30. In another embodiment, the software 60 may require the user to connect to the lighting devices 30 though the operating system settings.

Upon connecting the portable electronic device 20 to one or more lighting devices 30, the software 60 may prompt the user to enter the SSID and passcode, or may require the user to confirm the SSID and passcode. Once the wireless connection 70 is established, the portable electronic device 20 may send the WLAN information, which includes wireless connection information as well as user account information. The wireless connection information includes the SSID and the user account information may include a user name and password.

Figure 3A:
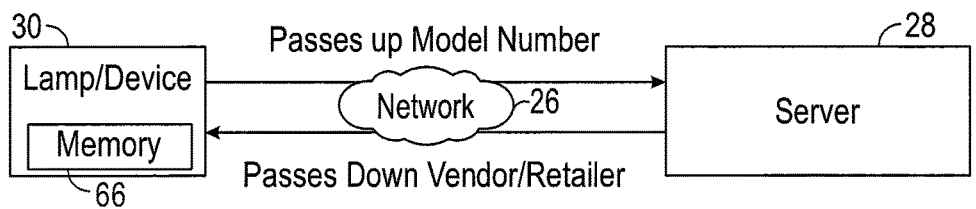
FIGS. 3A-3B illustrate various approaches for connecting a lighting fixture to a server through a network.
Figure 3B:
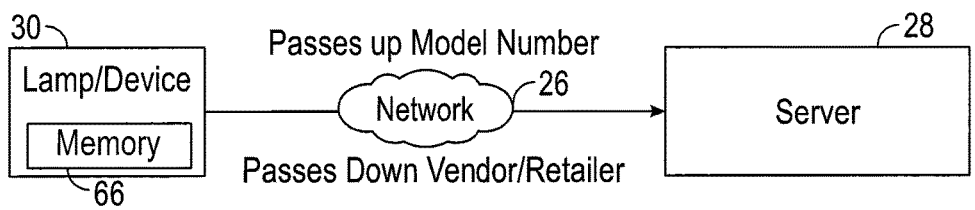

FIGS. 3A-3B illustrate various approaches for connecting the lighting device 30 to the servers 28 through the network 26. FIG. 3A is an illustration of the lighting device 30 connecting to the network 26 for the first time. In the embodiment as seen in FIG. 3A, the SSID saved in the memory 66 of the lighting fixture 30 only includes the serial number of the device, and not the specific manufacturer, distributer, or retailer of the lighting fixture 30. The lighting fixture 30 sends the SSID to the server 28 through the network 26. In response to receiving the SSID from the lighting fixture 30, the server 28 may authenticate the lighting fixture 30, and then sends a message to the lighting device 30 over the network 26. The message indicates a particular manufacturer, distributor, or retailer that the lighting device 30 is in communication with to purchase various products, and is described in greater detail below.

In one illustrative example, the message indicates the manufacturer of the lighting device 30, which in this case would be Technical Consumer Products Inc., of Aurora, Ohio. However, in another embodiment the light fixture 30 may be connected to the server 28 of a retailer, such as Walmart® or True Value Hardware. Specifically, in one embodiment the light fixture 30 may connect to the server 28 associated with the retailer that the light fixture 30 was purchased from. As explained below, in one embodiment a user may purchase other products from the retailer using the network connection 26 between the lighting fixture 30 and the server 28.

FIG. 3B is an illustration of the lighting device 30 connecting to the network 26 for the first time, where the SSID saved in the memory 66 of the lighting fixture 30 includes both the serial number and the specific manufacturer, distributer, or retailer of the lighting fixture 30. The lighting fixture 30 sends the SSID to the server 28 through the network 26.

Turning back to FIGS. 1 and 2, the microphone 68 of a lighting fixture 30 is a transducer that converts sound into an electrical signal. The processor 64 receives the electrical signals from the microphone, and determines an action based on the electrical signal that was received. For example, in one embodiment the processor 64 includes voice recognition software, which identifies words and phrases in spoken language and converts them to a machine-readable format.

If a user wishes to purchase an item through the network 26 using the lighting fixtures 30, a user may first say a word or phrase that activates the voice recognition software such as, for example, 'OK light bulb". The user may then identify what item he or she would like to purchase. For example, a user may say "OK light bulb, I need to buy potato chips from Retailer X". The microphone 68 converts the voice command into an electric signal, and the processor converts the electric signal into machine-readable form. The lighting device 30 may then send the command, which is in machine-readable form, over the network 26 and to the servers 28. The command indicates the product to be purchased as well as the specific retailer of the product. For example, the lighting device 30 sends a command indicating that a bag of potato chips from Retailer X should be purchased.

In another embodiment, the processor 64 may also include other sound recognition software that detects various sounds, determines the source of the sound, analyzes the sound, and determines if a particular product needs to be purchased from a particular retailer based on the sound. For example, in one embodiment the sound is the specific noise that a clothes washer or a dishwasher creates during a wash cycle. The microphone 68 converts the sound of the clothes washer or dishwasher into an electronic signal and send the signal to the processor 64. The processor 64 determines which appliance is producing the sound. For example, the processor 64 may determine that the sound is produced by a clothes washer. In one embodiment, the processor 64 may have saved in memory a particular item that was purchased for the clothes washer such as laundry detergent. Specifically, the brand and size of the laundry detergent, as well as the retailer from whom the detergent was purchased from is saved in the memory 66 of the lighting fixture 30. The size of the laundry detergent indicates how many loads of laundry may be washed. For example, a laundry detergent bottle containing 150 ounces of liquid laundry detergent may be able to wash about ninety-six loads of laundry. The processor 64 may also have the number of wash cycles that the clothes washer has completed since the last bottle of laundry detergent was purchased. The processor 64 of the lighting device 30 may then determine if the current laundry detergent bottle is depleted or is near depletion based on the size of the of the bottle and the number of wash cycles. If the laundry detergent bottle is near depletion or is depleted, then the lighting device 30 sends a command in machine-readable form over the network 26 and to the servers 28. The command indicates that another bottle of laundry detergent needs to be purchased from the same retailer.

In the embodiments as shown in FIGS. 1-2, the wireless connection 70 is based on WLAN signals. However, in the embodiment as shown in FIG. 4 the lighting fixtures 30 are connected using a personal area network based on the IEEE 802.15.4 specification. It is to be appreciated that the connections based on the IEEE 802.15.4 connection are similar to the embodiments described above and illustrated in FIGS. 1-2, except that the lighting devices 30 may not connect to the network 26 directly. Instead, as seen in FIG. 4, a gateway or hub 90 is provided to connect the lighting devices 30 to the network 26. Furthermore, the lighting devices 30 may also have custom clusters 92 saved in the memory 94 as well. Each cluster represents a set of standardized or customized commands as what tasks a device may perform. In the embodiment as shown in FIG. 4, the clusters 92 are customized, since there is no existing cluster that defines the tasks. Specifically, as seen in FIG. 4, there is a cluster 92A for Model Number, a cluster 92B for the vendor or retailer, a cluster 92C for decoded order items, and a cluster 92D for decoded order items. In still another embodiment which is described in greater detail below and shown in FIG. 6, the lighting fixtures 30 are connected to a wireless device such as a smartphone based on a wireless protocol for exchanging data over short distances using short-wavelength ultra-high frequency radio waves. For example, in one embodiment, the lighting fixtures 30 connect to one another using based on the IEEE 802.15 standard (i.e., Bluetooth®). In an embodiment, relatively short distances may include distance up to about 200 meters within the line of sight and about 30 to 35 meters in a typical office environment.

Referring to FIG. 2, the microphone 68 of a particular lighting fixture 30 only has the ability to detect voice commands within a limited proximity. Therefore, if a user walks from one room, and out of proximity from a particular lighting device 30, then the microphone 68 may be unable to detect the user's voice. Thus, in one embodiment the disclosed system may provide seamless voice-activated control as a user walks throughout the building. Specifically, the lighting device 30 may be configured to connect to other lighting devices using a mesh network, where the processor 64 of the lighting fixture 30 monitors a sound amplitude of the microphone 68. The processor 64 continuously monitors a sound amplitude measured by the microphone 68, where the sound amplitude may represent a sound or a user's voice. In response to the sound amplitude reaching a threshold level, the processor 64 executes instructions for connecting the lighting device 30 to the portable electronic device 20 through the wireless connection 70. As explained below, one of the lighting fixtures 30 within the mesh network may initiate a voice call through the network 26 and the wireless connection 70.

Figure 5:
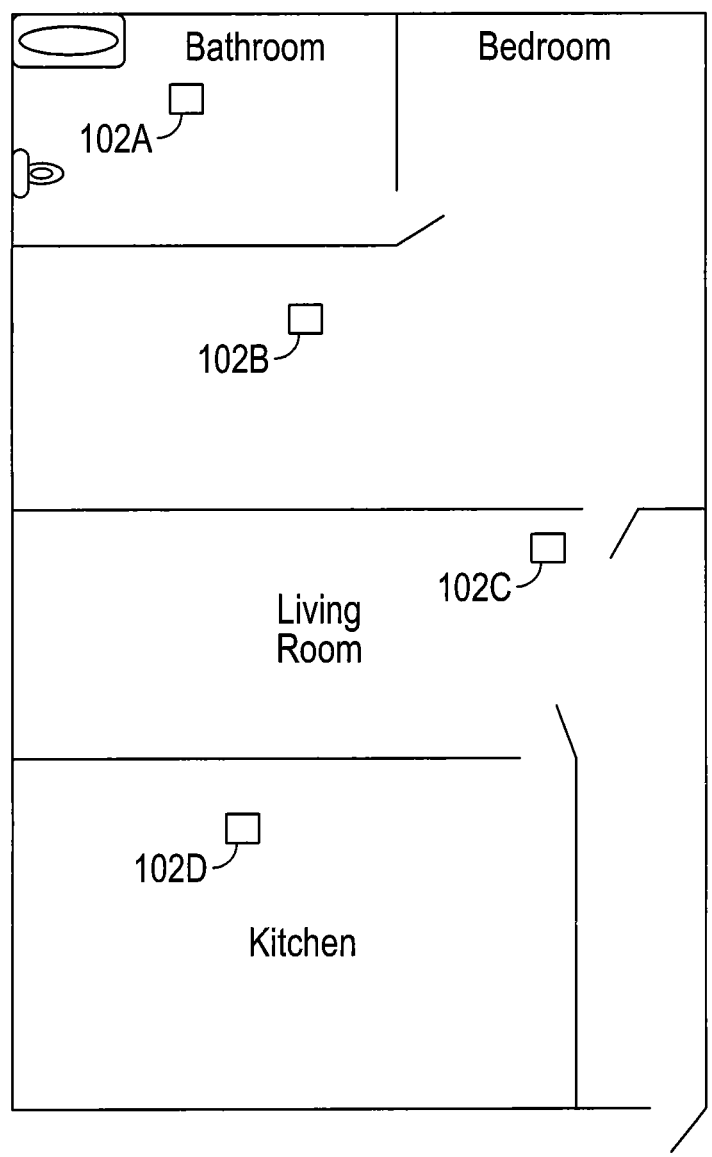
FIG. 5 is a schematic illustration of a home employing the system shown in FIG. 1.
Figure 6:
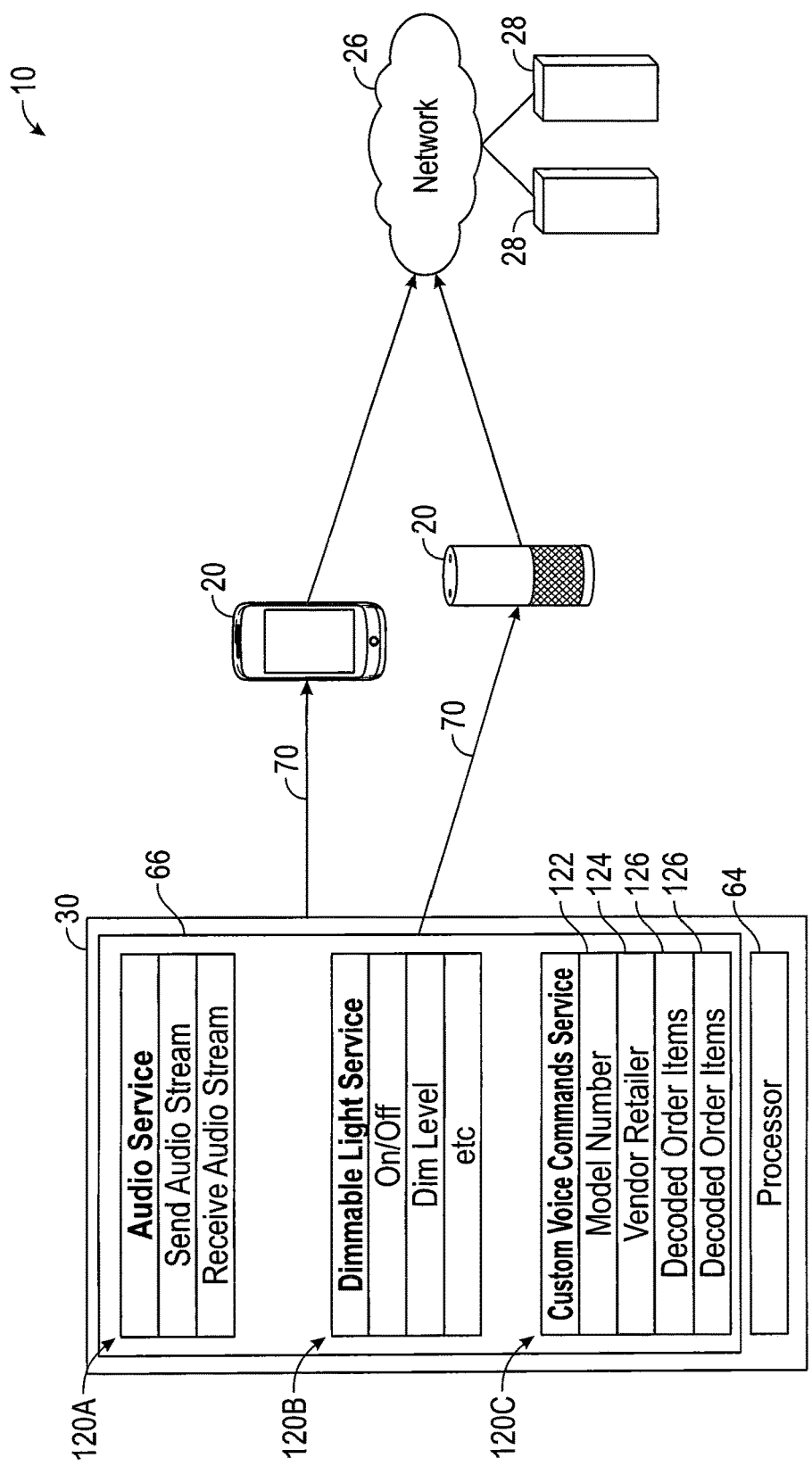
FIG. 6 is an illustration of another wireless lighting control system based on another type of wireless network.

FIG. 5 is an illustration of a mesh network that may be used to provide continuous voice-activated control, even as a user walks in and out of proximity of a particular lamp 102. In the example as shown, the system 100 is located in a home including a bathroom, a bedroom, a living room, and a kitchen. In the example as shown, each lamp 102 includes a microphone and a speaker. The lamps 102 are in communication with one another by a mesh network. As a user exits the shower, he or she may say "please call my sister Amy". The lamp 102A located in bathroom may then initiate a call to the user's sister, Amy, though a smartphone 104. In one embodiment, the lamp 102A may initiate a Session Initiation Protocol (SIP) packetized voice call using the wireless connection between the device 102 and the network 26 (FIG. 1). Once the smartphone 104 connects the call, the user may speak to his or her sister though the microphone and speaker of the lamp 102A. Also, the lamp 102A in the bathroom instructs the remaining lamps 102 in the mesh network to activate their respective microphones.

The user may then walk from the bathroom and into the bedroom. As the user walks into the bedroom, lamp 102B (located in the bedroom) continues to monitor the microphone until the microphone amplitude reaches a threshold level (i.e., the user is proximate to the lamp such that the microphone may clearly detect the user's voice). Once the threshold is reached, the lamp 102A in the bathroom disconnects from the call and the lamp 102B in the bedroom is activated. The remaining lamps 102C and 102D may also be used to provide a seamless voice call as the user walks through the home.

In the embodiments as shown in FIGS. 1-2, the wireless connection 70 is based on WLAN signals and the embodiment shown in FIG. 4 the lighting fixtures 30 are connected using a personal area network based on the IEEE 802.15.4 specification. Turning now to FIG. 6, the lighting device 30 is connected to multiple portable electronic device 20 based on a wireless protocol such as the IEEE 802.15 standard. Specifically, the lighting device 30 is connected to a smartphone as well as a smart speaker. Both the smartphone and the smart speaker are in communication with one or more servers 28 through the network 26, where the network 26 includes one or more private or public networks (e.g., the Internet) that enable the exchange of data.

Continuing to refer to FIG. 6, various services or profiles 120 may be saved in memory 66 of the lighting device 30. The profiles 120 define various parameters for initializing communication between the lighting device 30 and another wireless device. Specifically, in the non-limiting embodiment as shown the lighting device 30 includes an audio service profile 120A, a light service profile 120B, and a voice command service profile 120C. As explained below, the voice command service profile 120C is a custom profile that is specific to the present disclosure.

The audio service profile 120A defines how audio signals may be sent and received by the lighting device 30. The light service profile 120B defines an ON/OFF feature. Additionally, in the embodiment as shown, the light service profile 120B also defines a dimmable feature of the lighting device 30. In other words, the light service profile 120B defines how a user may dim the lighting device 30 using wireless control. Although dimming is described, other features may be included as well such as, but not limited to, color control (i.e., changing the wavelength or color of the visible light).

As mentioned above, the voice command service profile 120C saved in memory 66 is a custom profile that is unique to the present disclosure. Specifically, the voice command service profile 120C is a custom profile that defines how a user's voice commands are decoded into text by the processor 64. The voice command service profile further defines how the text is analyzed to determine at least one specific key feature, where the key feature is required in order to recognize specific commands and requests within the text. The key features are indicate of an action that the lighting device 30 may need to execute. Specifically, for example, the voice command profile 120C includes instructions for the processor 64 to determine key features such as, but not limited to, a model number or name of items mentioned within the text. As explained below, the lighting device 30 connects to the network 26 to order the items online. In other words, the voice command profile 120C instructs the processor 64 to decode a voice command into text, analyze the text to determine key features required to recognize specific commands and requests embedded in the text, and communicates the key feature over the wireless connection 70 to the portable electronic device 20.

In the exemplary embodiment as shown, the voice command service profile 120C lists a model number 122, a vendor number 124, and a one or more decoded order items 126. The model number 122 represents a retailer-specific model number of the lighting device 30. The vendor number 124 represents a specific numerical string that is assigned to a particular retailer that a user orders items from. The decoded order items 126 represent a linked list of one more items, For example, if a the decoded order items 126 represented multiple items on a grocery list, then all of the items could be linked and uploaded to the network 26 at the same time. For example, a user may wish to order a list of items online from a particular retailer. In the present example, the user may order specific ingredients to bake a cake like eggs, sugar, flour, and butter from a particular grocery store or discount retailer. The various items would be linked to one another to create a grocery list for cake ingredients, and the list would be uploaded to the network 26 and sent to one of the server 28 associated with the grocery store.

Similar to the embodiment as described above and illustrated in FIGS. 1-2, instead of or in addition to voice commands, the lighting device 30 may also include custom profiles for recognizing sounds. Specifically, the lighting device 30 may also detect various sounds and determine if a particular product needs to be purchased by the retailer based on the sounds (e.g., the wash cycles of a clothes washer).

In the embodiment as shown in FIG. 6, the lighting device 30 is not connected directly to the network 26 and the server 28. Instead, the lighting device 30 is in communication with the smartphone and the smart speaker, which are located within proximity or at a relatively short distance away (e.g., about 200 meters line of sight or about 35 meters in an office environment). The smart speaker 130 may be able to follow verbal commands and control products throughout a home or office. Some examples of products that may be controlled by the smart speaker 130 include, but are not limited to, lighting, heating, ventilation and air conditioning (HVAC) systems, and home appliances such as washer/dryers and dishwashers. The portable electronic device 20 and the smart speaker 130 are both connected to the server 28 through the network 26.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A wireless device for connection to a network, comprising:
    an antenna configured for establishing a wireless connection;
    one or more processors; and
    a memory coupled to the one or more processors, the memory storing data comprising a pre-defined sequence of characters that uniquely name a particular type of network that the antenna establishes communication with and program code that, when executed by the one or more processors, causes the one or more processors to:
    initially set the one or more processors into a default mode;
    in response to connecting the wireless device to mains power, receive network information containing the sequence of characters that uniquely name the particular type of network through the wireless connection from a portable electronic device; and
    in response to receiving the network information, establishing network communication with the portable electronic device.

2. The wireless device of claim 1, wherein the sequence of characters is a pre-defined service set identifier (SSID) including a case sensitive sequence of alphanumeric characters having a maximum length of 32 characters.

3. The wireless device of claim 2, wherein the wireless connection is based on the Institute of Electrical and Electronics Engineers (IEEE) 802.11 standard.

4. The wireless device of claim 2, wherein the SSID starts with a string of characters that represent a manufacturer, a distributer, or a retailer of the wireless device.

5. The wireless device of claim 2, wherein the SSID ends with a serial number associated with the wireless device.

6. The wireless device of claim 2, wherein the SSID only includes a serial number associated with the wireless device.

7. The wireless device of claim 1, wherein the one more processors include sound recognition software that detects a particular sound, determined a source of the particular sound, analyzes the particular sound, and determines that a particular product needs to be purchased from a retailer based on analyzing the particular sound.

8. The wireless device of claim 1, wherein the wireless connection is a personal area network.

9. The wireless device of claim 8, wherein a plurality of custom clusters are saved in the memory, and wherein each cluster represents a set of standardized commands defining tasks that the wireless device is capable of performing.

10. The wireless device of claim 1, comprising a microphone for detecting voice commands and sound, wherein the one more processors include voice recognition logic.

11. The wireless device of claim 10, wherein the wireless device is configured to connect to at least one other wireless device using a mesh network, and wherein the one or more processors monitors a sound amplitude of the microphone.

12. The wireless device of claim 1, comprising at least one lighting element coupled to the one or more processors.

13. The wireless device of claim 1, wherein the wireless device is selected from the group consisting of: a light emitting diode (LED) lamp, an incandescent lamp, a compact fluorescent lamp (CFL), or a gas-discharge lamp.

14. A wireless device for connection to a network, comprising:
    an antenna for establishing a wireless connection;
    a microphone for detecting voice commands and sound;
    one or more processors in communication with the microphone; and
    a memory coupled to the one or more processors, the memory storing a voice command service profile that defines instructions to decode voice commands into text by the one or more processors and program code that, when executed by the one or more processors, causes the one or more processors to:
    wirelessly connect to a portable electronic device by the wireless connection;
    decode a voice command detected by the microphone into text; and
    analyze the text to determine at least one specific key feature required to recognize a specific command embedded within the text, wherein the at least one specific key feature is indicative of an action that requires execution by the processor of the wireless device; and
    communicate the at least one specific key feature over the wireless connection.

15. The wireless device of claim 14, wherein the one more processors include sound recognition software that detects a particular sound, determines a source of the particular sound, analyzes the particular sound, and determines that a particular product needs to be purchased from a retailer based on analyzing the particular sound.

16. The wireless device of claim 14, wherein the wireless connection is a personal area network based on the Institute of Electrical and Electronics Engineers (IEEE) 802.15.4 standard.

17. The wireless device of claim 14, comprising at least one lighting element coupled to the one or more processors.

18. The wireless device of claim 14, wherein the wireless device is selected from the group consisting of: a light emitting diode (LED) lamp, an incandescent lamp, a compact fluorescent lamp (CFL), or a gas-discharge lamp.

19. The wireless device of claim 14, wherein the wireless connection is for communication over short distances and is based on short-wavelength ultra-high frequency radio waves.

20. The wireless device of claim 19, wherein the short distances are up to about 200 meters within a line of sight, and about 30 to 35 meters in an office environment.

* * * * *